US009602553B2

(12) United States Patent
Wang et al.

(10) Patent No.: US 9,602,553 B2
(45) Date of Patent: Mar. 21, 2017

(54) METHOD, APPARATUS, AND SYSTEM FOR IMPLEMENTING VOIP CALL IN CLOUD COMPUTING ENVIRONMENT

(71) Applicant: Huawei Technologies Co., Ltd., Shenzhen (CN)

(72) Inventors: Yungui Wang, Nanjing (CN); Fuqing Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 14/303,030

(22) Filed: Jun. 12, 2014

(65) Prior Publication Data
US 2014/0293997 A1 Oct. 2, 2014

Related U.S. Application Data

(63) Continuation of application No. PCT/CN2012/079321, filed on Jul. 30, 2012.

(30) Foreign Application Priority Data

Dec. 29, 2011 (CN) .......................... 2011 1 0451666

(51) Int. Cl.
*H04L 29/06* (2006.01)
*H04L 29/08* (2006.01)

(52) U.S. Cl.
CPC .......... *H04L 65/1069* (2013.01); *H04L 67/12* (2013.01); *H04L 67/38* (2013.01); *H04L 67/42* (2013.01); *H04L 67/40* (2013.01)

(58) Field of Classification Search
CPC .......... H04L 29/06027; H04L 65/1066; H04L 65/1069; H04L 65/1083; H04L 65/1086; H04L 65/1089; H04L 67/12; H04L 67/38; H04L 67/40; H04L 67/42
See application file for complete search history.

(56) References Cited

U.S. PATENT DOCUMENTS 7,764,667 B1 † 7/2010 Stewart
2007/0071002 A1 † 3/2007 Jepson
(Continued)

FOREIGN PATENT DOCUMENTS

CN 101873392 A 10/2010
CN 102299962 A 12/2011
(Continued)

OTHER PUBLICATIONS

Poikselka, M., et al., "The IMS: IP Multimedia Concepts and Services," XP002730624, Jan. 1, 2009, pp. 362-363.
(Continued)

*Primary Examiner* — Khoa Huynh
(74) *Attorney, Agent, or Firm* — Conley Rose, P.C.

(57) ABSTRACT

A method for implementing a VOIP call in a cloud computing environment and relates to the VOIP call field. By using an RDP proxy to implement bidirectional transmission of voice streams between a cloud desktop client and a communication peer end, and further implement a VOIP call, a communication delay and load of a cloud desktop virtual machine are reduced. The method is used for a VOIP call in a cloud computing environment.

11 Claims, 10 Drawing Sheets

(56) References Cited

U.S. PATENT DOCUMENTS

| | | | |
|---|---|---|---|
| 2007/0083658 A1* | 4/2007 | Hanna | H04L 29/06027 709/227 |
| 2009/0096762 A1† | 3/2009 | Mazzaferri | |
| 2009/0190740 A1 | 7/2009 | Chishti et al. | |
| 2009/0204711 A1† | 8/2009 | Binyamin | |
| 2011/0069721 A1 | 3/2011 | Jajodia et al. | |
| 2011/0096762 A1† | 4/2011 | Basart | |
| 2012/0102084 A1* | 4/2012 | Hiltunen | G06F 1/32 709/201 |

FOREIGN PATENT DOCUMENTS

| | | | |
|---|---|---|---|
| WO | 2006/030997 A1 † | 3/2006 | |
| WO | 2010100602 A2 | 9/2010 | |
| WO | 2011091977 A1 | 8/2011 | |

OTHER PUBLICATIONS

Huang, S., et al., "Proxy-based Security Audit System for Remote Desktop Access," Proceedings of the 18th International Conference on Computer Communications and Networks, ICCCN, XP031527801, Aug. 3, 2009, 5 pages.

Foreign Communication From A Counterpart Application, European Application No. 12862316.2, Extended European Search Report dated Oct. 17, 2014, 10 pages.

"Series G: Transmission Systems and Media, Digital Systems and Networks, Digital Terminal Equipments—Coding of Voice and Audio Signals, Pulse Code Modulation (PCM) of Voice Frequencies, Amendment 2: New Appendix III—Audio Quality Enhancement Toolbox," ITU-T, G.711, Amendment 2, Nov. 2009, 16 pages.

"Series G: Transmission Systems and Media, Digital Systems and Networks, Digital Terminal Equipments—Coding of Analogue Signals by Methods other than PCM, Dual Rate Speech Coder for Multimedia Communications Transmitting at 5.3 and 6.3 kbit/s," ITU-T, G.723.1, May 2006, 64 pages.

Seriers G: Transmission Systems and Media, Digital Systems and Networks, Digital Terminal Equipments —Coding of Voice and Audio Signals, Coding of Speech at 8 kbit/s using Conjugate-structure Algebraic-Code-Excited Linear Prediction (CS-ACELP), ITU-T, G.729, Jun. 2012, 152 pages.

"Series H: Audiovisual and Multimedia Systems, Infrastructure of Audiovisual Services—Communication Procedures, Implementors' Guide for the H.248 Sub-Series of Recommendations ("Media Gateway Control Protocol")," ITU-T, H.248 Sub-Series Implementors' Guide, Dec. 2, 2011, 50 pages.

Series H: Audiovisual and Multimedia Systems, Infrastructure of Audiovisual Services—Communication Procedures, Implementors' Guide for Recommendation of H.323 System (Packet-based Multimedia Communications Systems): H.323, H.225.0, H.245, H.246, H.283, H.341, H.450 Series, H.460 Series, and H.500 Series, ITU-T, H.323 System Implementors' Guide, Nov. 6, 2009, 77 pages.

"Series X: Data Networks and Open System Communication, Open Systems Interconnection—Connection-Mode Protocol Specifications, Information Technology—Open Systems Interconnection—Protocol for Providing the Connection-Mode Transport Service," ITU-T, X.224, Nov. 1995, 157 pages.

Foreign Communication From A Counterpart Application, PCT Application No. PCT/CN2012/079321, English Translation of International Search Report dated Nov. 8, 2012, 2 pages.

Foreign Communication From A Counterpart Application, PCT Application No. PCT/CN2012/079321, English Translation of Written Opinion dated Nov. 8, 2012, 5 pages.

J. Rosenberg, "SIP:Session Initiation Protocol" Jun. 2002; The Internet Society.†

\* cited by examiner
† cited by third party

METHOD, APPARATUS, AND SYSTEM FOR IMPLEMENTING VOIP CALL IN CLOUD COMPUTING ENVIRONMENT

CROSS-REFERENCE TO RELATED APPLICATION

This application is a continuation of International Application No. PCT/CN2012/079321, filed on Jul. 30, 2012, which claims priority to Chinese Patent Application No. 201110451666.5, filed on Dec. 29, 2011, both of which are hereby incorporated by reference in their entireties.

TECHNICAL FIELD

The present invention relates to the communications field, and in particular, to a method, an apparatus, and a system for implementing a VOIP call in a cloud computing environment.

BACKGROUND

Generally, when a Voice over Internet Protocol (VOIP) call is made between a cloud desktop client and a communication peer end in a cloud computing environment, the cloud desktop client remotely controls a cloud desktop virtual machine of a server in the cloud computing environment by using the Remote Desktop Protocol (RDP), runs VOIP software in the cloud desktop virtual machine, and performs signaling interworking with the communication peer end by using a VOIP control protocol. VOIP voice between the cloud desktop client and the communication peer end is transmitted by using the cloud desktop virtual machine. During this process, a VOIP voice stream from the communication peer end needs to be transmitted to the cloud desktop virtual machine by using a wide area network (WAN). After being processed by the cloud desktop virtual machine, the VOIP voice stream also needs to be transmitted by the cloud desktop virtual machine to the cloud desktop client by using the WAN network, and vice versa, thereby implementing the call between the cloud desktop client and the communication peer end.

Thus, the VOIP voice stream needs to pass through the WAN network twice and also needs to be processed by a cloud computing server in a data center. In one aspect, a communication delay is increased; in another aspect, load of the cloud computing server is increased.

SUMMARY

Embodiments of the present invention provide a method, an apparatus, and a system for implementing a VOIP call in a cloud computing environment, which can reduce a communication delay and load of a cloud computing server.

To achieve the foregoing objectives, the embodiments of the present invention adopt the following technical solutions:

According to one aspect, a method for implementing a VOIP call in a cloud computing environment is provided and includes: receiving, by a cloud desktop virtual machine, a VOIP call request message from an RDP client at a local end or a communication peer end; sending, by the cloud desktop virtual machine, a session setup request message to an RDP proxy according to the VOIP call request message; receiving, by the cloud desktop virtual machine, a session setup response message sent by the RDP proxy, where the session setup response message includes voice session media information of the RDP proxy; and sending, by the cloud desktop virtual machine, the voice session media information of the RDP proxy to the communication peer end, so that the communication peer end makes, according to the voice session media information of the RDP proxy, a VOIP call with the RDP client at the local end by using the RDP proxy.

According to another aspect, a method for implementing a VOIP call in a cloud computing environment is provided and includes: receiving, by an RDP proxy, a session setup request message sent by a cloud desktop virtual machine according to a VOIP call request message of an RDP client at a local end or a communication peer end; sending, by the RDP proxy, a voice channel setup request message to the RDP client at the local end according to the session setup request message; receiving, by the RDP proxy, a voice channel setup response message sent by the RDP client at the local end, where the voice channel setup response message includes virtual channel media information of the RDP client at the local end; sending, by the RDP proxy, a session setup response message to the cloud desktop virtual machine, where the session setup response message includes voice session media information of the RDP proxy, so that the cloud desktop virtual machine sends the voice session media information of the RDP proxy to the communication peer end; and receiving and forwarding, by the RDP proxy, a VOIP voice stream from the RDP client at the local end and a VOIP voice stream from the communication peer end, so as to implement a VOIP call between the RDP client at the local end and the communication peer end.

According to another aspect, a cloud desktop virtual machine apparatus is provided and includes: a receiving unit configured to receive a VOIP call request message from an RDP client at a local end or a communication peer end; and a sending unit configured to send a session setup request message to an RDP proxy according to the VOIP call request message received by the receiving unit.

The receiving unit is further configured to receive a session setup response message sent by the RDP proxy, where the session setup response message includes voice session media information of the RDP proxy.

The sending unit is further configured to send the voice session media information of the RDP proxy to the communication peer end, so that the communication peer end makes, according to the voice session media information of the RDP proxy, a VOIP call with the RDP client at the local end by using the RDP proxy.

According to another aspect, an RDP proxy apparatus is provided and includes: a receiving unit configured to receive a session setup request message sent by a cloud desktop virtual machine according to a VOIP call request message of an RDP client at a local end or a communication peer end; and a sending unit configured to send a voice channel setup request message to the RDP client at the local end according to the session setup request message received by the receiving unit.

The receiving unit is further configured to receive a voice channel setup response message sent by the RDP client at the local end, where the voice channel setup response message includes virtual channel media information of the RDP client at the local end.

The sending unit is further configured to send a session setup response message to the cloud desktop virtual machine, where the session setup response message includes voice session media information of the RDP proxy apparatus, so that the cloud desktop virtual machine sends the voice session media information of the RDP proxy apparatus to the communication peer end.

The receiving unit is further configured to receive a voice stream from the RDP client at the local end and a voice stream from the communication peer end.

The sending unit is further configured to forward the voice stream from the RDP client at the local end and the voice stream from the communication peer end, so as to implement a VOIP call between the RDP client at the local end and the communication peer end.

According to another aspect, a network system is provided and includes the foregoing cloud desktop virtual machine apparatus and the foregoing RDP proxy apparatus.

By using the foregoing technical solutions, the method for implementing a VOIP call in a cloud computing environment, a cloud desktop virtual machine apparatus, an RDP proxy apparatus, and a network system provided by the embodiments of the present invention enable information interaction among a cloud desktop virtual machine, an RDP proxy, an RDP client at a local end, and a communication peer end during a process of implementing a VOIP call between the RDP client at the local end and the communication peer end, and eventually enable the RDP proxy to receive and forward a VOIP voice stream from the RDP client at the local end and a VOIP voice stream from the communication peer end, thereby implementing the VOIP call between the RDP client at the local end and the communication peer end. Compared with the prior art, the present invention can reduce a communication delay and load of the cloud computing server by using the RDP proxy to implement bidirectional transmission of the voice streams, which require no processing by the cloud desktop virtual machine of a cloud computing server, and do not pass through a WAN network twice.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

For a better understanding of the present invention, the following briefly describes a network system that uses a method for implementing a VOIP call in a cloud computing environment according to an embodiment of the present invention first.

Figure 1:
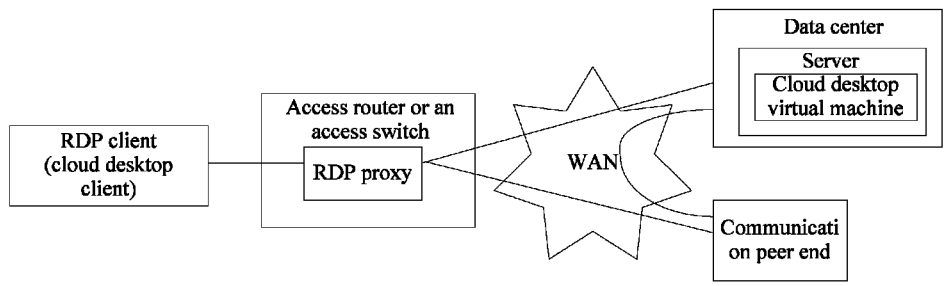
FIG. 1 is a schematic diagram of a network system that uses a method for implementing a VOIP call in a cloud computing environment according to an embodiment of the present invention.

FIG. 1 is a schematic diagram of a network system that uses a method for implementing a VOIP call in a cloud computing environment according to an embodiment of the present invention.

As shown in FIG. 1, the network system includes an RDP client, an access router or an access switch, a server in a data center, and a communication peer end.

The RDP client may be a client that can run the RDP and may be included in a cloud desktop client. The cloud desktop client refers to a most basic access terminal in a cloud computing service, including an ultra-thin client, a thin client, and a fat client. The ultra-thin client is a most simplified client and has an embedded operating system that is invisible to a user. The ultra-thin client almost has no local resources and has only a simple central processing unit (CPU) and a small quantity of memory, and the like. Generally, the thin client is a customized operating system and has a little more local resources, for example, supporting a local voice coding/encoding capability. The fat client refers to a common computer or a laptop device that runs a standard operating system and can work offline without depending on a data center. The cloud desktop client includes the RDP client and the RDP client can run the RDP.

The access router and/or the access switch is located at an edge of an enterprise network in which the cloud desktop client is located, and is used to connect to a WAN, so that the cloud desktop client accesses the network and connects to the data center to gain access to the cloud desktop virtual machine in the server. In this network system, an RDP proxy is set in the access router or the access switch, and the RDP proxy can run the RDP. It may be understood that, the RDP proxy is preferably set in the access router or the access switch, but can also be set in other positions, which is not limited in the present invention.

The data center is located in the enterprise network or an operator's network rent by an enterprise, is used to store network data, and includes a server.

The cloud desktop virtual machine is located in a cloud computing server in the data center, where a virtualization technology is deployed on the cloud computing server. The cloud desktop virtual machine corresponds to the cloud desktop client, and is a virtual personal computer that the user sees. Generally, one cloud desktop client corresponds to one cloud desktop virtual machine. On the cloud desktop virtual machine, there is a routine operating system, office software, and some common software. Generally, the cloud desktop virtual machine includes VOIP software and an RDP controller, and the RDP controller can run the RDP.

In the network system shown in FIG. 1, the RDP client is one party in VOIP communication. Another party of the VOIP communication corresponding to the RDP client is the communication peer end. The communication peer end, for example, may be a cloud desktop client, VOIP software of a common PC, a public switched telephone network (PSTN) phone connected by using a media gateway and a media gateway controller, or the like.

The present invention aims to implement bidirectional transmission of voice streams between the cloud desktop client and the communication peer end by using the RDP proxy, and further implement a VOIP call without requiring processing by the cloud desktop virtual machine in the data center. Therefore, load of the data center may be reduced.

In addition, generally, data transmission performed on a local area network between the cloud desktop client and the access router and/or the access switch requires high bandwidth and a low delay. Therefore, replacing the cloud desktop virtual machine with the RDP proxy in the access router and/or the access switch to implement the foregoing process may reduce a delay.

Based on the foregoing brief introduction, the following describes in detail the embodiments of the present invention.

Figure 2:
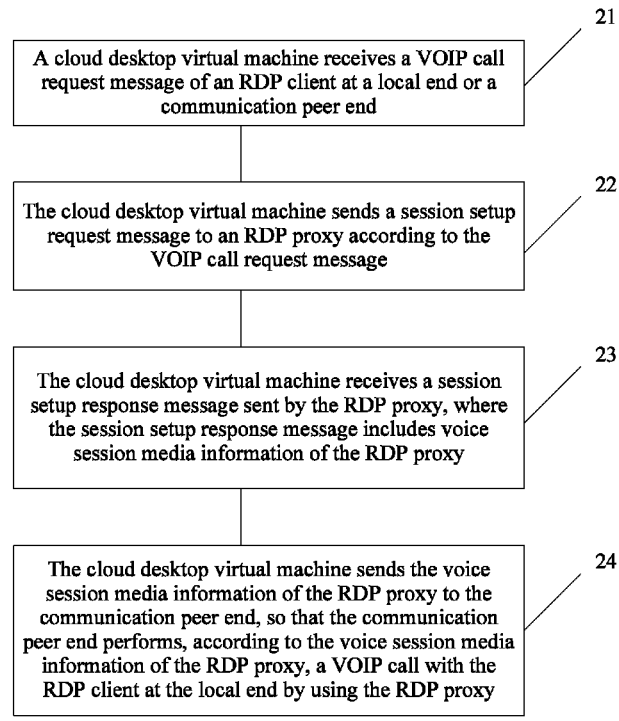
FIG. 2 is a flowchart of a method for implementing a VOIP call in a cloud computing environment according to an embodiment of the present invention.

As shown in FIG. 2, an embodiment of the present invention provides a method for implementing a VOIP call in a cloud computing environment, including the following steps:

21. A cloud desktop virtual machine receives a VOIP call request message of an RDP client at a local end or a communication peer end.

In this embodiment of the present invention, the RDP client at the local end refers to an RDP client in current communication, is one party of the current communication in a same local area network as an RDP proxy, and is specially included in a cloud desktop client. The communication peer end is the other party in the communication, and may be a cloud desktop client, VOIP software of a common PC, a PSTN phone connected by using a media gateway and a media gateway controller, or the like.

When a VOIP call is made, one party needs to initiate a call first. This party may be the RDP client at the local end or the communication peer end. The RDP client at the local end or the communication peer end sends a call request message to the cloud desktop virtual machine, requesting the cloud desktop virtual machine to call the other party in the communication. For example, when the RDP client at the local end functions as a calling party and the communication peer end functions as a called party, the cloud desktop virtual machine receives the call request message of the RDP client at the local end; when the RDP client at the local end functions as the called party and the communication peer end functions as the calling party, the cloud desktop virtual machine receives the call request message of the communication peer end.

Specifically, a user may trigger a graphical interface of VOIP software on the cloud desktop client to trigger the VOIP software to start a call, that is, send a call request message to the cloud desktop virtual machine. The VOIP software is installed on the cloud desktop virtual machine of the cloud computing server, and may be specifically, for example, the Skype, Microsoft Network (MSN), QQ, eSpace, or the like.

22. The cloud desktop virtual machine sends a session setup request message to an RDP proxy according to the VOIP call request message.

It should be noted that, the session setup request message sent by the cloud desktop virtual machine to the RDP proxy may be an extended message or a newly added message of the RDP protocol. Similarly, a "session setup response message", "voice channel setup request message", or "voice channel setup response message" mentioned hereinafter may also be an extended message or a newly added message of the RDP protocol.

After the cloud desktop virtual machine receives the call request message, because the RDP proxy is required to implement the VOIP call, the cloud desktop virtual machine sends a session setup request message to the RDP proxy.

Specifically, when the user triggers the graphical interface of the VOIP software to send the call request, the VOIP software on the cloud desktop virtual machine receives the call request message and triggers the RDP controller to send the session setup request message to the RDP proxy, requesting the RDP proxy to set up a session between both parties of the voice communication.

23. The cloud desktop virtual machine receives a session setup response message sent by the RDP proxy, where the session setup response message includes voice session media information of the RDP proxy.

The voice session media information of the RDP proxy includes an Internet Protocol (IP) address and a port number of the RDP proxy, and optionally, may further include a voice coding format and the like.

After the RDP proxy receives the session setup request from the cloud desktop virtual machine, if the RDP proxy accepts the request, the RDP proxy replies to the cloud desktop virtual machine with a session setup response message, which is used to inform the cloud desktop virtual machine of acceptance of this request, and carries voice session media information of the RDP proxy in the session response message, so that the cloud desktop virtual machine informs the communication peer end of the voice session media message of the RDP proxy. Therefore, during a process of a VOIP call between the RDP client at the local end and the communication peer end, the communication peer end sends, according to the voice session media information of the RDP proxy, a media stream used to communicate with the RDP client at the local end to the RDP proxy.

24. The cloud desktop virtual machine sends the voice session media information of the RDP proxy to the communication peer end, so that the communication peer end performs, according to the voice session media information of the RDP proxy, the VOIP call with the RDP client at the local end by using the RDP proxy.

It should be noted that, before the cloud desktop virtual machine sends the voice session media information of the RDP proxy, if a format of the voice session media information described by the cloud desktop virtual machine to the RDP proxy and a format of the voice session media information described by the cloud desktop virtual machine to the communication peer end are inconsistent, the cloud desktop virtual machine may convert a coding format of the voice session media information of the RDP proxy to a coding format of voice session media information of the communication peer end, or the cloud desktop virtual machine may convert a coding format of the voice session media information of the peer end to a coding format of the voice session media information of the RDP proxy.

It should be noted that, the cloud desktop virtual machine and the communication peer end bear a call setup message by using protocol signaling used by the VOIP software of the cloud desktop virtual machine.

After the communication peer end receives the voice session media information of the RDP proxy, during the process of the VOIP call between the RDP client at the local end and the communication peer end, the communication peer end sends, according to the voice session media message of the RDP proxy, a voice stream used to communicate with the RDP client at the local end to the RDP proxy, so that the RDP proxy implements the VOIP call between the RDP client at the local end and the communication peer end, without requiring the cloud desktop virtual machine to process the voice stream.

The method for implementing a VOIP call in a cloud computing environment provided by this embodiment of the present invention can implement bidirectional transmission of voice streams by using an RDP proxy when a VOIP call is made between an RDP client at a local end and a communication peer end, where the voice streams require no processing by a cloud desktop virtual machine of a cloud computing server, and do not pass through a WAN network twice. Therefore, a communication delay and load of the cloud computing server are reduced.

In an embodiment of the present invention, before a VOIP call is made between an RDP client at a local end and a communication peer end, the RDP client at the local end needs to set up a remote desktop connection with a cloud desktop virtual machine. Specifically, the RDP client at the local end sets up the remote desktop connection with the cloud desktop virtual machine by using the RDP proxy. Therefore, optionally, in step 21, before the cloud desktop virtual machine receives the call request message of the RDP client at the local end or the communication peer end, the method further includes:

The cloud desktop virtual machine receives a remote desktop connection request message sent by the RDP proxy, where the remote desktop connection request message includes proxy information of the RDP proxy.

The proxy information of the RDP proxy includes an IP address and a port number of the RDP proxy, and optionally, may further include information such as authentication and a key.

In this case, in step 22, the sending, by the cloud desktop virtual machine, a session setup request message to an RDP proxy according to the call request message includes sending, by the cloud desktop virtual machine, the session setup request message to the RDP proxy according to the call request message and the proxy information of the RDP proxy.

The cloud desktop virtual machine may learn, according to the remote desktop connection request message sent by the RDP proxy, that the RDP proxy can join the VOIP call process of the RDP client at the local end. In addition, the cloud desktop virtual machine may identify the RDP proxy according to the proxy information of the RDP proxy, so that the cloud desktop virtual machine sends, according to the proxy information of the RDP proxy, a session setup request message to the RDP proxy in step 22 when the RDP client at the local end makes the VOIP call or the communication peer end calls the RDP client at the local end.

Optionally, after receiving the remote desktop connection request message sent by the RDP proxy, the cloud desktop virtual machine may send a remote desktop connection response message to the RDP proxy, and carries, in the remote desktop connection response message, an option indicating whether that the RDP proxy joins in a subsequent VOIP call setup process is accepted, so that the RDP proxy can learn, according to this option, whether the request of the RDP proxy is accepted.

For example, the remote desktop connection response message is an X.224 Connection Confirm message in the Microsoft RDP protocol. Optionally, the remote desktop connection response message may further carry information related to the DRP, such as authentication and a key.

Figure 3:
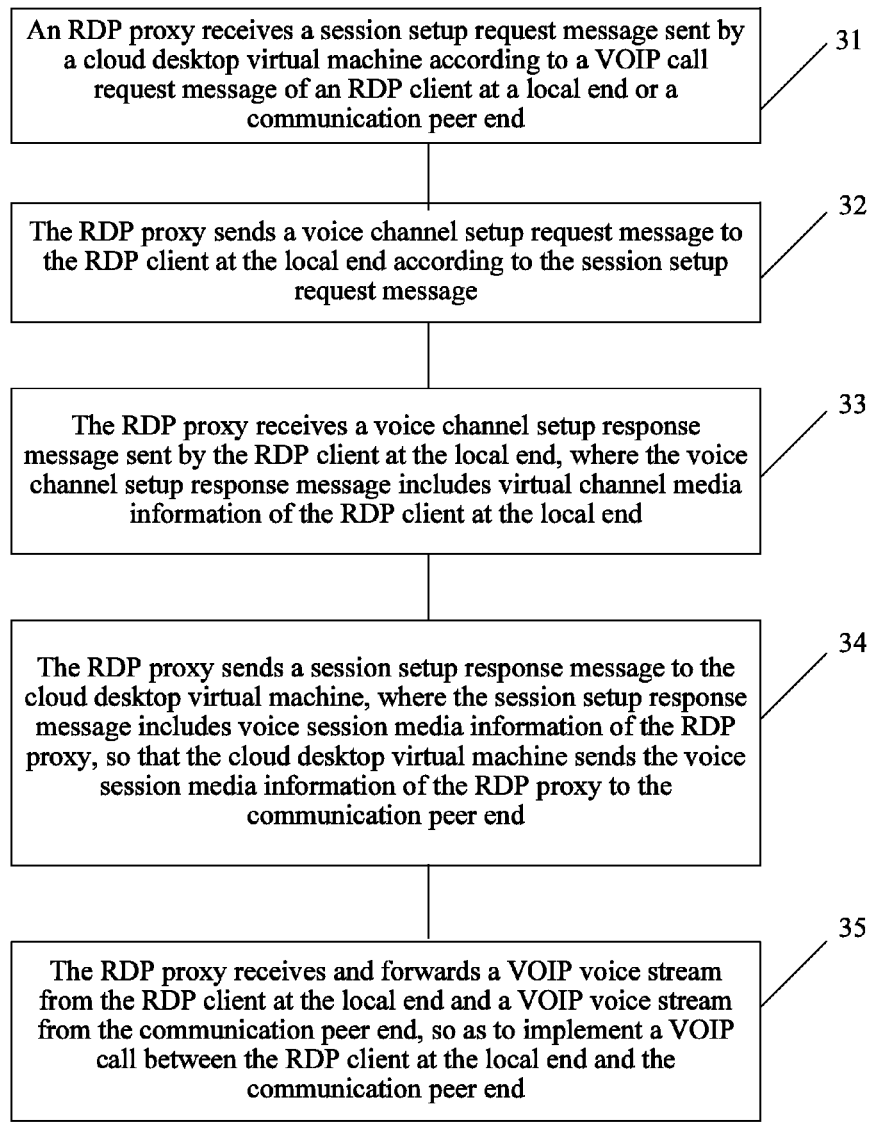
FIG. 3 is a flowchart of a method for implementing a VOIP call in a cloud computing environment according to an embodiment of the present invention.

Accordingly, FIG. 3 is a flowchart of a method for implementing a VOIP call in a cloud computing environment according to an embodiment of the present invention. The method is based on an RDP proxy, as shown in FIG. 3, and includes the following steps:

31. The RDP proxy receives a session setup request message sent by a cloud desktop virtual machine according to a VOIP call request message of an RDP client at a local end or a communication peer end.

It should be noted that, the RDP proxy preferably runs on a main control board of an access router or an access switch, or runs on an open service platform board of the access router or the access switch. In this way, because data transmission performed on a local area network between the cloud desktop client and the access router and/or the access switch requires high bandwidth and a low delay, a voice delay of both parties of the communication is reduced when voice communication is performed between the cloud desktop client and the communication peer end.

32. The RDP proxy sends a voice channel setup request message to the RDP client at the local end according to the session setup request message.

After the RDP proxy receives the call request message sent by the cloud desktop virtual machine, to join a process of a VOIP call between the RDP client at the local end and the communication peer end, the RDP proxy sends a voice channel setup request message to the RDP client at the local end, so as to request setting up a voice channel with the RDP client at the local end, so that the RDP proxy receives a voice stream from the RDP client at the local end and sends a voice stream to the RDP client at the local end.

33. The RDP proxy receives a voice channel setup response message sent by the RDP client at the local end, where the voice channel setup response message includes virtual channel media information of the RDP client at the local end.

The virtual channel media information of the RDP client at the local end includes a virtual channel identifier used for voice media transmission in an RDP session and a voice coding type used on the virtual channel, and optionally, may further include other information such as capability information of the voice channel, protocol version information, and encryption information.

After receiving the voice channel setup request message, the RDP client at the local end replies to the RDP proxy with a voice channel setup response message, and carries the virtual channel media information of the RDP client at the local end in the voice channel setup response message, so that the RDP proxy sets up a voice channel with the RDP client at the local end according to the virtual channel media information, and learns the virtual channel media information of the RDP client at the local end. In this way, the DRP proxy sends, to the RDP client at the local end according to the virtual channel media information of the RDP client at the local end, a media stream sent by the communication peer end to the RDP client at the local end during the process of the VOIP call between the RDP client at the local end and the communication peer end.

34. The RDP proxy sends a session setup response message to the cloud desktop virtual machine, where the session setup response message includes voice session media information of the RDP proxy, so that the cloud desktop virtual machine sends the voice session media information of the RDP proxy to the communication peer end.

After the voice channel is set up between the RDP proxy and the RDP client at the local end, the RDP proxy sends the session setup response message to the cloud desktop virtual machine and permits setting up a session between the RDP client at the local end and the communication peer end, and carries voice session media information of the RDP proxy in the session setup response message, so as to send the voice session media information of the RDP proxy to the communication peer end by using the cloud desktop virtual machine. In this way, the communication peer end learns the voice session media information of the RDP proxy and further sends the voice stream to the RDP proxy.

35. The RDP proxy receives and forwards a VOIP voice stream from the RDP client at the local end and a VOIP voice stream from the communication peer end, so as to implement the VOIP call between the RDP client at the local end and the communication peer end.

Specifically, the RDP proxy receives the voice stream from the RDP client at the local end and the voice stream from the communication peer end, and transmits the voice stream from the RDP client at the local end to the communication peer end and transmits the voice stream from the communication peer end to the RDP client at the local end, according to the virtual channel media information of the RDP client at the local end and the voice session media information of the communication peer end, so as to implement the VOIP call between the RDP client at the local end and the communication peer end.

The method for implementing a VOIP call in a cloud computing environment provided by this embodiment of the present invention can implement bidirectional transmission of voice streams by using an RDP proxy when a VOIP call is made between an RDP client at a local end and a communication peer end, where the voice streams require no processing by a cloud desktop virtual machine of a cloud computing server, and do not pass through a WAN network twice. Therefore, a communication delay and load of the cloud computing server are reduced.

Before a VOIP call is made between the RDP client at the local end and the communication peer end, the RDP client at the local end needs to set up a remote desktop connection with the cloud desktop virtual machine. Specifically, the RDP client at the local end sets up the remote desktop connection with the cloud desktop virtual machine by using the RDP proxy. Therefore, in step 31, before the RDP proxy receives the session setup request message sent by the cloud desktop virtual machine according to the call request message of the RDP client at the local end or the communication peer end, optionally, the method further includes:

sending, by the RDP proxy, a remote desktop connection request message to the cloud desktop virtual machine, so as to request setting up a remote desktop connection with the cloud desktop virtual machine, where the remote desktop connection request message includes proxy information of the RDP proxy.

The proxy information of the RDP proxy includes an IP address and a port number of the RDP proxy, and may further include information such as authentication and a key.

Specifically, a process of setting up, by the RDP client at the local end, a remote desktop connection with the cloud desktop virtual machine by using the RDP proxy may include the following two implementation manners:

A first manner of setting up a remote desktop connection is as follows:

The RDP proxy receives a remote desktop connection request sent by the RDP client at the local end.

When a remote desktop connection is set up between the RDP client at the local end and the cloud desktop virtual machine, the RDP client at the local end sends the remote desktop connection request to the cloud desktop virtual machine. When passing through the access router or the access switch, the remote desktop connection request is redirected to the RDP proxy and is received by the RDP proxy.

The RDP proxy inserts the proxy information of the RDP proxy into the received remote desktop connection request.

In this case, the sending, by the RDP proxy, a remote desktop connection request message to the cloud desktop virtual machine includes sending, by the RDP proxy to the cloud desktop virtual machine, the remote desktop connection request message into which the proxy information of the RDP proxy is inserted.

Optionally, the RDP proxy receives a remote desktop connection response message sent by the cloud desktop virtual machine, so as to set up a remote desktop connection with the cloud desktop virtual machine.

After receiving the remote desktop connection request message sent by the RDP proxy, the cloud desktop virtual machine may send the remote desktop connection response message to the RDP proxy, and carries, in the remote desktop connection response message, an option indicating whether that the RDP proxy joins in a subsequent VOIP call setup process is accepted, so that the RDP proxy learns, according to this option, whether the request of the RDP proxy is accepted.

For example, the remote desktop connection response message is an X.224 Connection Confirm message in the Microsoft RDP protocol. Optionally, the remote desktop connection response message may further carry the information related to the RDP, such as authentication and a key.

In addition, after the RDP proxy receives the remote desktop connection response message sent by the cloud desktop virtual machine, optionally, the RDP proxy sends a remote desktop connection response message to the RDP client. Before sending, the RDP proxy deletes the proxy information of the RDP proxy included in the remote desktop connection response message.

A second manner of setting up a remote desktop connection is different from the previous manner. The RDP proxy separately sets up a remote desktop connection with the RDP client at the local end and a remote desktop connection with the cloud desktop virtual machine, and then sets up an associative relationship between the two connections, thereby setting up a remote desktop connection between the RDP client at the local end and the cloud desktop virtual machine. The second manner may include the following steps:

The RDP proxy receives a first remote desktop connection request sent by the RDP client at the local end, so as to set up a first remote desktop connection with the RDP client at the local end. Optionally, the RDP proxy further sends a first remote desktop connection response message to the RDP client at the local end.

The RDP proxy sends a second remote desktop connection request message to the cloud desktop virtual machine, so as to set up a second remote desktop connection with the cloud desktop virtual machine. Optionally, the cloud desktop virtual machine further sends a second remote desktop connection response message to the RDP client at the local end.

The RDP proxy establishes an associative relationship between the first remote desktop connection and the second remote desktop connection, so as to set up the remote desktop connection between the RDP client at the local end and the cloud desktop virtual machine.

Figure 4:
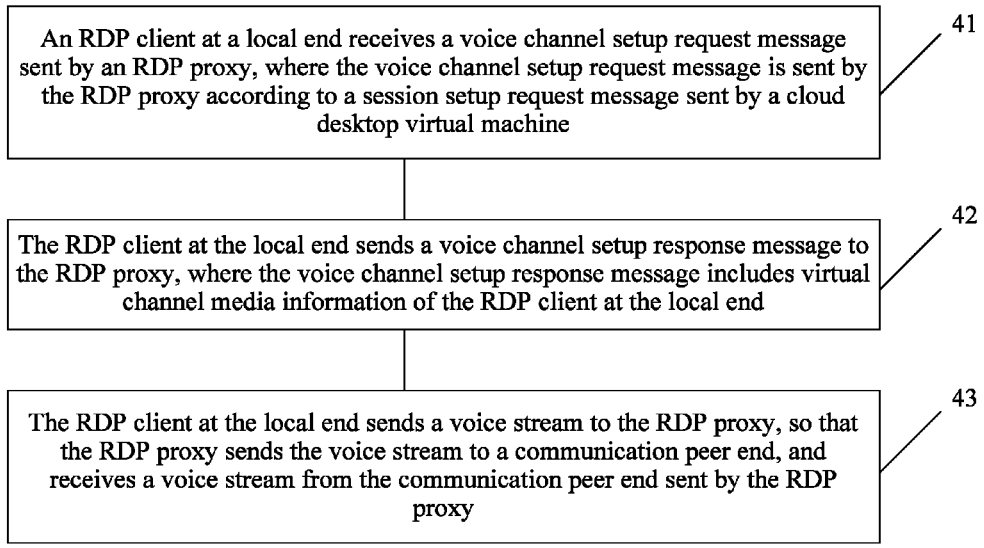
FIG. 4 is a flowchart of a method for implementing a VOIP call in a cloud computing environment according to an embodiment of the present invention.

Accordingly, FIG. 4 is a flowchart of a method for implementing a VOIP call in a cloud computing environment according to an embodiment of the present invention. The method is based on an RDP client at a local end, as shown in FIG. 4, and includes the following steps:

41. The RDP client at the local end receives a voice channel setup request message sent by an RDP proxy, where the voice channel setup request message is sent by the RDP proxy according to a session setup request message sent by a cloud desktop virtual machine.

When one party initiates a call, the cloud desktop virtual machine receives a call request and sends the session setup request message to the RDP proxy, requesting the RDP proxy to join in setting up a session. After receiving the session setup request message, the RDP proxy sends the voice channel setup request message to the RDP client at the local end, so as to request setting up a voice channel between the RDP client at the local end and the RDP proxy.

42. The RDP client at the local end sends a voice channel setup response message to the RDP proxy, where the voice channel setup response message includes virtual channel media information of the RDP client at the local end.

After receiving the voice channel setup request message sent by the RDP proxy, the RDP client at the local end sends the voice channel setup response message to the RDP proxy, agrees to accept the voice channel setup request, and carries the virtual channel media information of the RDP client at the local end in the voice channel setup response message, so that the RDP proxy transmits a voice stream to the RDP client at the local end according to the virtual channel media information.

43. The RDP client at the local end sends a voice stream to the RDP proxy, so that the RDP proxy sends the voice stream to a communication peer end, and receives a voice stream from the communication peer end sent by the RDP proxy.

The method for implementing a VOIP call in a cloud computing environment provided by this embodiment of the present invention can implement bidirectional transmission of voice streams by using an RDP proxy when a VOIP call is made between an RDP client at a local end and a communication peer end, where the voice streams require no processing by a cloud desktop virtual machine of a cloud computing server, and do not pass through a WAN network twice. Therefore, a communication delay and load of the cloud computing server are reduced.

In an embodiment provided by the present invention, before a VOIP call is made between an RDP client at the local end and a communication peer end, a remote desktop connection needs to be set up between the RDP client at the local end and a cloud desktop virtual machine, so that the RDP client at the local end can transmit a call request to the cloud desktop virtual machine, and then the cloud desktop virtual machine initiates a call. Therefore, optionally, in step 41, before the RDP client at the local end receives the voice channel setup request message sent by the RDP proxy, the method further includes sending, by the RDP client at the local end, a remote desktop connection request to the cloud desktop virtual machine by using the RDP proxy.

Figure 5:
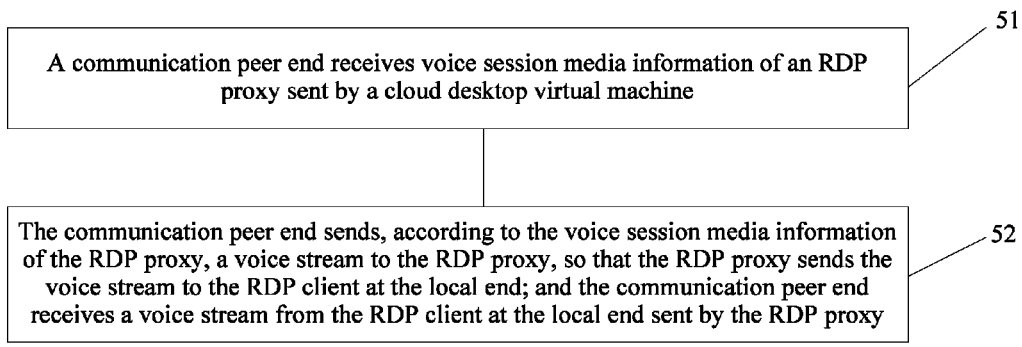
FIG. 5 is a flowchart of a method for implementing a VOIP call in a cloud computing environment according to an embodiment of the present invention.

Accordingly, FIG. 5 is a flowchart of a method for implementing a VOIP call in a cloud computing environment according to an embodiment of the present invention. The method is based on a communication peer end, as shown in FIG. 5, and includes the following steps:

51: The communication peer end receives voice session media information of an RDP proxy sent by a cloud desktop virtual machine.

52: The communication peer end sends, according to the voice session media information of the RDP proxy, a voice stream to the RDP proxy, so that the RDP proxy sends the voice stream to the RDP client at the local end; and the communication peer end receives a voice stream from the RDP client at the local end sent by the RDP proxy.

The method for implementing a VOIP call in a cloud computing environment provided by this embodiment of the present invention can implement bidirectional transmission of voice streams by using an RDP proxy when a VOIP call is made between an RDP client at a local end and a communication peer end, where the voice streams require no processing by a cloud desktop virtual machine of a cloud computing server, and do not through a WAN network twice. Therefore, a communication delay and load of the cloud computing server are reduced.

For a better understanding of the technical solution of the method for implementing a VOIP call in a cloud computing environment provided by this embodiment of the present invention, the following further describes in detail the method with specific embodiments.

According to the method for implementing a VOIP call in a cloud computing environment provided by this embodiment, one party is an RDP client at a local end that is set in a cloud desktop client, and the other party is a communication peer end. The communication peer end is not limited and may be a cloud desktop client and may also be a non-cloud desktop client. In this embodiment, an example in which the RDP client at the local end functions as a calling end (that is, a call initiating end) and the communication peer end functions as a called end (that is, a call receiving end) is used as an example for description.

The method for implementing a VOIP call in a cloud computing environment according to this embodiment includes three processes, that is, a remote desktop connection setup process, a VOIP call setup process, and a voice stream transmission process. Details are as follows:

1. Remote Desktop Connection Setup Process

During this process, the RDP proxy joins the remote desktop connection setup process. The RDP client on the cloud desktop client sets up a remote desktop session connection with an RDP controller on the cloud desktop virtual machine by using the RDP proxy. This process may be implemented by using the manner described below.

It should be noted that, in this embodiment of the present invention, the RDP proxy is a program that can execute the RDP protocol and runs on a main control board of the access router or the access switch, or runs on an open service platform board of the access router or the access switch.

Figure 6:
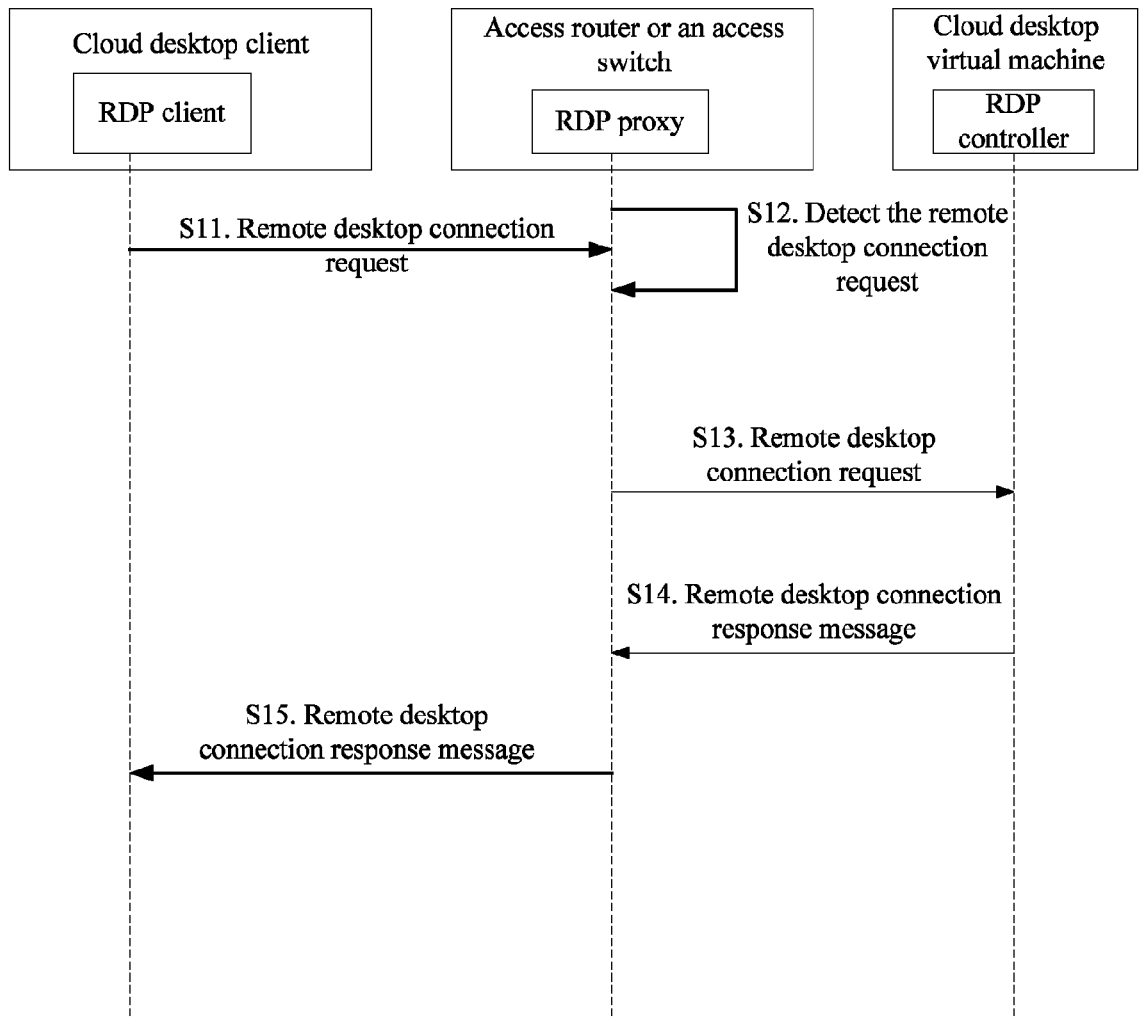
FIG. 6 is a schematic diagram of a process of setting up a remote desktop connection according to an embodiment of the present invention.

As shown in FIG. 6, a specific process of a manner of setting up a remote desktop connection is as follows:

S11: An RDP client sends a remote desktop connection request message to an RDP controller.

S12: An access router or an access switch redirects service traffic of the RDP client to an RDP proxy in access router or the access switch; the RDP proxy detects the remote desktop connection request message of the RDP client, for example, an X.224 Connection Request PDU message in the Microsoft RDP protocol, and then inserts proxy information of the RDP proxy into the remote desktop connection request message, where the proxy information of the RDP proxy includes an IP address and a port number of the RDP proxy, and optionally, the proxy information of the RDP proxy may further include information such as authentication and a key.

S13: The RDP proxy sends the remote desktop connection request message that carries the proxy information of the RDP proxy to the RDP controller, so that the RDP controller learns and saves the proxy information of the RDP proxy.

S14: After saving the proxy information of the RDP proxy, the RDP controller sends a remote desktop connection response message, for example, an X.224 Connection Confirm message in the Microsoft RDP protocol, to the RDP client. The remote desktop connection response message carries an option indicating whether the RDP controller accepts the RDP proxy, and optionally, the remote desktop connection response message may further carry information related to the DRP, such as authentication and a key.

S15: The RDP proxy deletes the proxy information related to the RDP proxy included in the remote desktop connection confirmation message, and sends the remote desktop connection confirmation message with the proxy information of the RDP proxy deleted to the RDP client.

After the RDP client receives the remote desktop connection confirmation message, the RDP client on the cloud desktop client sets up a remote desktop session connection with the RDP controller on the cloud desktop virtual machine.

It should be noted that, the foregoing describes a manner of setting up a remote desktop connection only by using an example, and other manners without departing from the spirit of the present invention may also be used to set up a remote desktop connection.

For example, the RDP proxy may be used as the RDP controller of the RDP client; meanwhile, the RDP proxy may be used as the RDP client of the RDP controller. In specific implementation, the IP address of the RDP proxy may be configured on the RDP client, that is, on the RDP client, the IP address of the RDP proxy is used as an IP address of the RDP controller; meanwhile, on the RDP controller, the IP address of the RDP proxy is used as the IP address of the RDP client. In this manner, the RDP proxy may be used as an intermediate end to implement interaction between the RDP client and the RDP controller.

In this manner, for a same user, two connections need to be set up on the RDP proxy: a remote desktop connection between the RDP client and the RDP proxy and a remote desktop connection between the RDP proxy and the RDP controller. Meanwhile, the RDP proxy needs to establish an associative relationship between the two connections, so as to correctly send content of the RDP client (for example, operation instruction information, a file stream, a video stream, and a voice stream) to the RDP controller, or correctly send content of the RDP controller to the RDP client.

Figure 7:
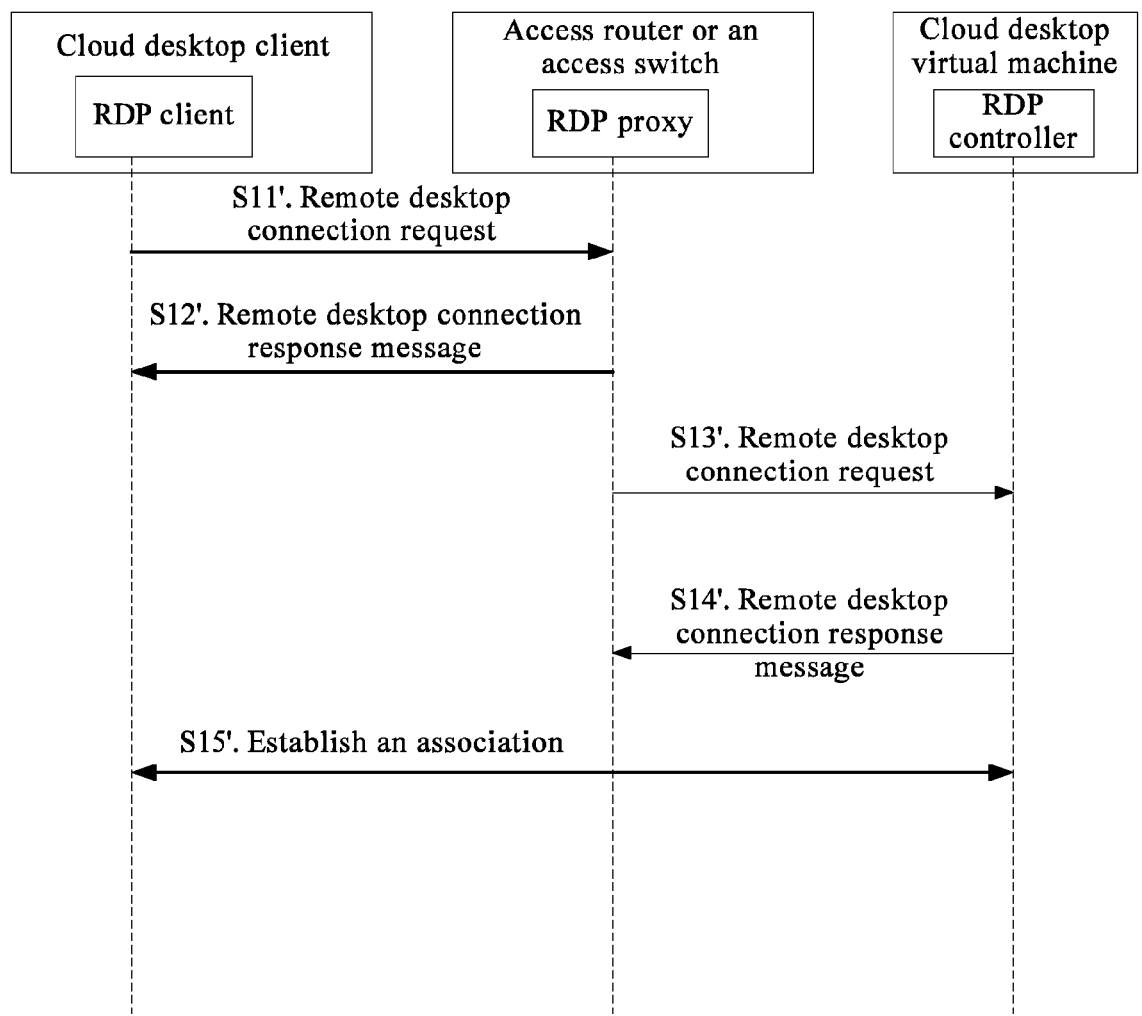
FIG. 7 is a schematic diagram of a process of setting up a remote desktop connection according to an embodiment of the present invention.

As shown in FIG. 7, a specific process of another manner of setting up a remote desktop connection is as follows:

S11': The RDP client at the local end sends a remote desktop connection request message to the RDP proxy.

S12': The RDP proxy sends a remote desktop connection response message to the RDP client at the local end, so as to set up a remote desktop connection with the RDP client at the local end.

S13': The RDP proxy sends a remote desktop connection request message to the cloud desktop virtual machine, where the remote desktop connection request message includes proxy information of the RDP proxy.

S14': The cloud desktop virtual machine sends a remote desktop connection response message to the RDP proxy, so as to set up a remote desktop connection with the RDP proxy.

S15': The RDP proxy establishes an associative relationship between the remote desktop connection between the RDP proxy and the RDP client at the local end, and the remote desktop connection between the RDP proxy and the cloud desktop virtual machine.

It should be noted that, in this manner, a sequence of the foregoing steps is adjustable, and may be implemented, for example, in a sequence of S13', S14', S11', S12', and S15', which is not limited in the present invention.

2. VOIP Call Setup Process

Figure 8:
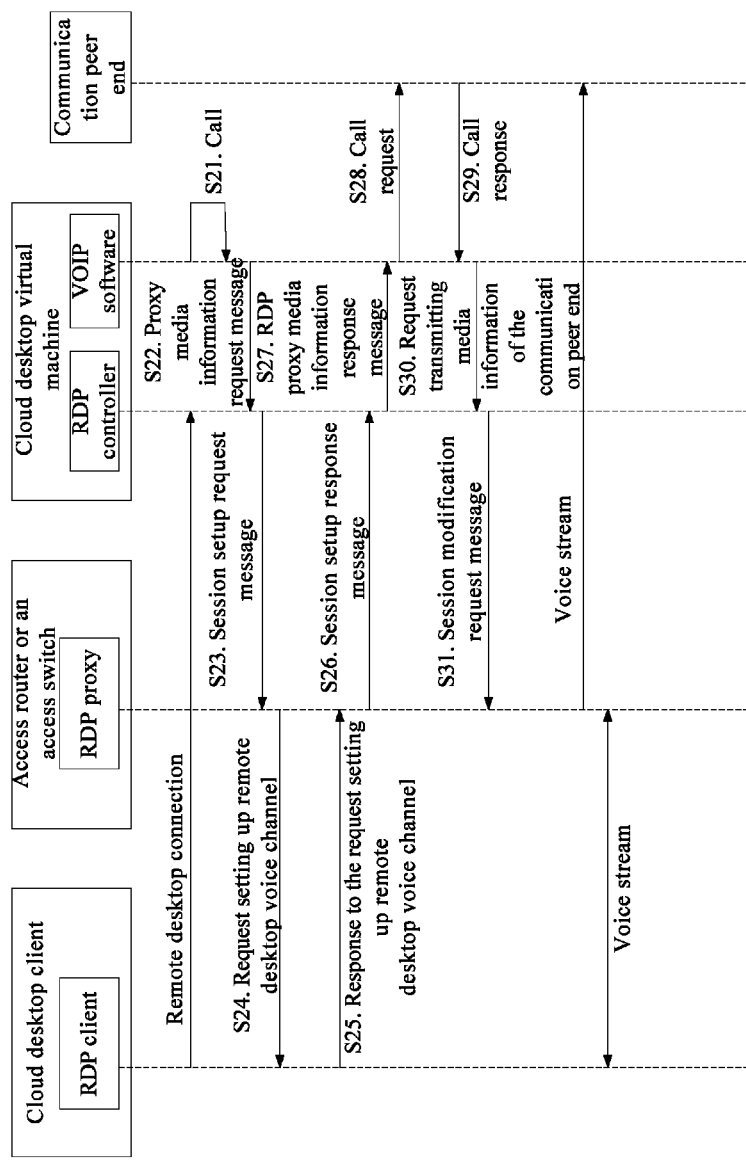
FIG. 8 is a schematic diagram of a process of setting up a VOIP call according to an embodiment of the present invention.

After the remote desktop connection is set up, a VOIP call can be set up. It should be noted that, the cloud desktop virtual machine and the communication peer end bear a call setup message by using protocol signaling used by VOIP software of the cloud desktop virtual machine. As shown in FIG. 8, a specific process of setting up the VOIP call is as follows:

S21: A user clicks a call request displayed on a VOIP software interface of an RDP client, for example, a certain contact on the eSpace or a certain phone number, where the call request is transmitted to the VOIP software of the cloud desktop virtual machine by using the RDP.

S22: After receiving the VOIP call request from the RDP client at a local end, the VOIP software of the cloud desktop virtual machine sends a request to an RDP controller, so as to request acquiring voice session media information of the VOIP voice call provided by the RDP proxy, which is generally described by using the Session Description Protocol (SDP), including an IP address, a port, a voice coding format, and the like; the VOIP software and the RDP controller communicate in a manner such as an interprocess message, application programming interface (API) invoking, or a network interface loopback.

S23: The RDP controller sends a session setup request message to the RDP proxy according to the request of the VOIP software and proxy information of the RDP proxy.

During a specific implementation process, using the Microsoft RDP protocol as an example, a definition of the RDP protocol needs to be extended for a protocol data unit (PDU) message used to set up the VOIP call, that is, VOIP_ESTABLISH_REQUEST_PDU. For another RDP, for example, International Co-operative Alliance (ICA), an extended message with a similar function may also be defined. Meanwhile, in the new PDU, it is implemented that an extended option carries the voice session media information of the RDP proxy.

S24: The RDP proxy sends a voice channel setup request message to the RDP client, so as to acquire virtual channel media information of the RDP client. A voice coding type used for the virtual channel media information of the RDP client on a virtual channel, optionally, further includes a protocol version, capability information of a voice channel, encryption information, and the like.

S25: The RDP client sends a voice channel setup response message to the RDP proxy, where the voice channel setup response message includes virtual channel media information of the RDP client at the local end.

S26: The RDP proxy saves the virtual channel media information of the RDP client, and reserves voice session media information that is sent to and received from a WAN network, where the voice session media information includes an IP address, a port, a voice coding format, and the like. Then, the RDP proxy sends a session setup response message to the RDP controller, where the session setup response message includes voice session media information of the RDP proxy, so that the cloud desktop virtual machine sends the voice session media information of the RDP proxy to the communication peer end. In specific implementation, accordingly, a new confirmation message, for example, VOIP_ESTABLISH_CONFIRM_PDU, needs to be defined.

S27: After receiving the session setup response message of the RDP proxy, the RDP controller sends the acquired voice session media information of the RDP proxy to the VOIP software.

S28: The VOIP software sends a call request message to the communication peer end, where the call request message carries the voice session media information of the RDP proxy acquired from the RDP controller.

S29: The communication peer end sends a call response message to the VOIP software, where the call response message includes voice session media information of the communication peer end, including an IP address, a port, and a coding format, and the like.

S30: The VOIP software sends an internal request message to the RDP controller, where the internal request message carries the voice session media information of the communication peer end.

S31: The RDP controller sends a session modification request message to the RDP proxy, where the session modification request message includes the voice session media information of the communication peer end. Using the RDP protocol as an example, a new PDU, that is, VOIP_MODIFICATION_REQUEST_PDU, needs to be defined. Meanwhile, media information of the communication peer end is carried in the PDU.

After the foregoing interaction process, the cloud desktop client cooperates with the cloud desktop virtual machine to complete the call setup process with the communication peer end by using the access router or the access switch (RDP proxy).

3. Voice Stream Transmission Process

After the VOIP call setup process is complete, transmission of a voice stream can be implemented. In one aspect, the RDP proxy receives voice media stream information of a remote end, and then encapsulates the voice media stream information on a voice virtual channel of a remote desktop session. Optionally, before being encapsulated on the voice virtual channel of the remote desktop session, the voice media stream information is converted to a coding format supported by the RDP client. The RDP client extracts a voice media stream from the voice virtual channel of the remote desktop session and sends the voice media stream to a physical audio card for playing. In another aspect, the RDP client extracts voice information that is input by a user to the physical audio card by using a microphone, encapsulates the voice information on a voice virtual channel of an RDP session, and then sends the voice information to the RDP proxy. The RDP proxy extracts the voice media stream information from the voice virtual channel, and then encapsulates the voice media stream information in an Real-time Transport Protocol (RTP) packet, and sends the RTP packet to the communication peer end. Optionally, if coding formats of the voice virtual channels of the communication peer end and the RDP client are inconsistent, before being encapsulated in the RTP packet, the voice media stream information further needs to be converted to a coding format supported by the communication peer end.

In this embodiment, when a VOIP call is made between an RDP client at a local end and a communication peer end, an RDP proxy learns virtual channel media information of the RDP client at the local end and voice session information of the communication peer end, and sends the voice session media information of the RDP proxy to a cloud desktop virtual machine. The cloud desktop virtual machine sends the voice session media information of the RDP proxy to the communication peer end. After learning the voice session media information of the RDP proxy, the communication peer end sends a voice stream to the RDP proxy. The RDP proxy sends the voice stream from the communication peer end to the RDP client at the local end and sends a voice stream from the RDP client at the local end to the communication peer end, thereby implementing the VOIP call between the RDP client at the local end and the communication peer end. Compared with the prior art, the RDP proxy implements bidirectional transmission of the voice streams without requiring processing by a cloud computing server in a data center. Therefore, load of the cloud computing server in the data center is reduced. In addition, the RDP proxy runs on a main control board of an access router or an access switch, or runs on an open service platform board of the access router or the access switch. In this way, because data transmission performed on a local area network between the cloud desktop client and the access router and/or the access switch requires high bandwidth and a low delay, a voice delay of both parties of the communication is reduced when voice communication is performed between the cloud desktop client and the communication peer end, so that the voice communication is more efficient.

It should be noted that, the VOIP call setup process in the previous embodiment is a VOIP call setup process during which the cloud desktop client functions as a calling party. However, in an actual application, a scenario in which the cloud desktop client functions as a called party may further appear. Therefore, optionally, the present invention may further provide another embodiment that is applicable to a scenario in which the RDP client at the local end functions as the called party and the communication peer end functions as the calling party. This embodiment is the same as the previous embodiment and also includes three processes, that is, the remote desktop connection setup process, the VOIP call setup process, and the voice stream transmission process. The remote desktop connection setup process and the voice stream transmission process are exactly the same as those in the previous embodiment. The only difference lies in the VOIP call setup process. The following describes the VOIP call setup process.

Figure 9:
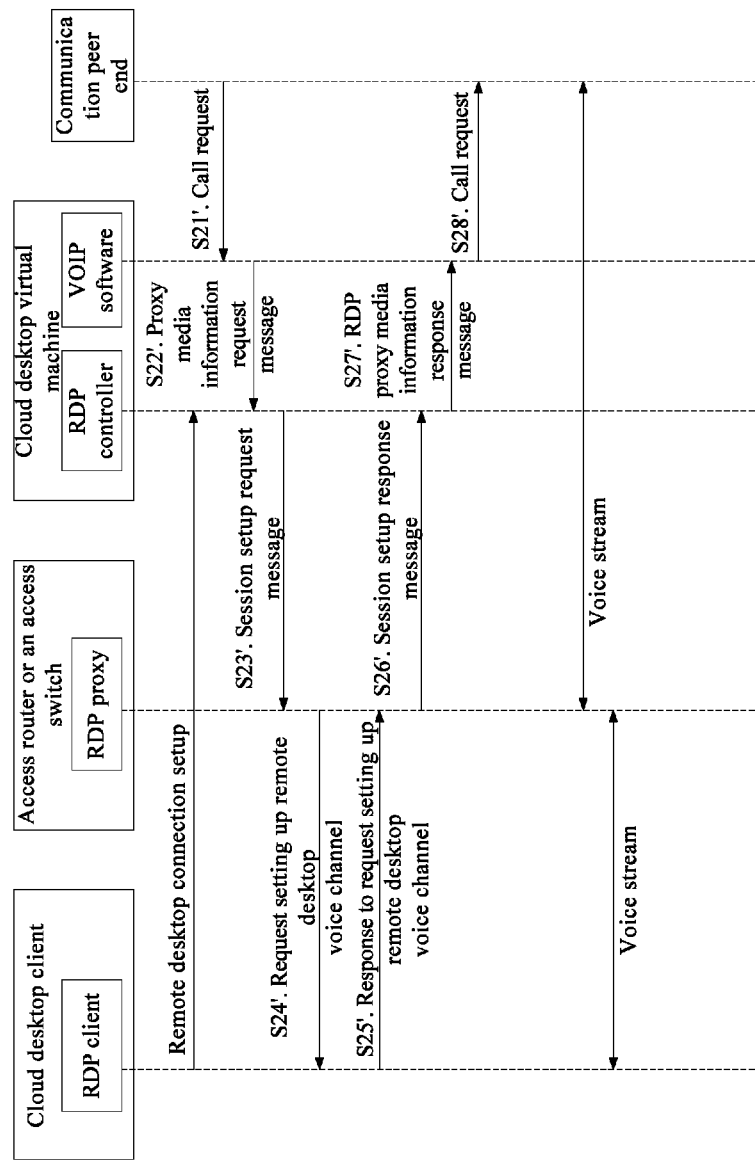
FIG. 9 is a schematic diagram of a process of setting up a VOIP call according to an embodiment of the present invention.

As shown in FIG. 9, when the RDP client at the local end functions as a local called end and the communication peer end functions as a local calling end, a process of setting up a VOIP call in this embodiment is as follows:

S21': The communication peer end calls a user of the RDP client at the local end. The cloud desktop virtual machine receives a VOIP call request message from the communication peer end and displays an incoming call from the communication peer end on VOIP software of the cloud desktop virtual machine, where the VOIP call request message includes voice session media information of the communication peer end; the VOIP software acquires the voice session media information of the communication peer end from the call request message of the communication peer end.

S22': The VOIP software sends a request message to the RDP controller, where the request message carries the voice session media information of the communication peer end, so as to request acquiring voice session media information of the VOIP voice call provided by the RDP proxy, which is generally described by using the Session Description Protocol (SDP), including an IP address, a port, a voice coding format, and the like; the VOIP software and the RDP controller communicate in a manner such as an interprocess message, API invoking, or a network interface loopback.

S23': The RDP controller sends a session setup request message to the RDP proxy, where the session setup request message includes the voice session media information of the communication peer end. During a specific implementation process, using the Microsoft RDP protocol as an example, a definition of the RDP protocol needs to be extended for a PDU message used to set up a VOIP call, that is, VOIP_ESTABLISH_REQUEST_PDU. For another RDP, for example, ICA, an extended message with a similar function may also be defined. Meanwhile, in the new PDU, it is implemented that a new extended option carries voice session media information of the RDP proxy and carries an extended option of the voice session media information of the communication peer end.

S24': The RDP proxy saves the voice session media information of the communication peer end and sends a voice channel setup request message to the RDP client, so as to acquire virtual channel media information of the RDP client. A voice coding type used for the virtual channel media information of the RDP client on a virtual channel, optionally, further includes a protocol version, capability information of a voice channel, encryption information, and the like.

S25': The RDP client sends a voice channel setup response message to the RDP proxy, where the voice channel setup response message includes the virtual channel media information of the RDP client at the local end.

S26': The RDP proxy saves the virtual channel media information of the RDP client, and reserves voice session media information that is sent to and received from a WAN network, where the voice session media information includes an IP address, a port, a voice coding format, and the like. Then, the RDP proxy sends a session setup response message to the RDP controller, where the session setup response message includes the voice session media information of the RDP proxy, so that the cloud desktop virtual machine sends the voice session media information of the RDP proxy to the communication peer end. In specific implementation, accordingly, a new confirmation message, for example, VOIP_ESTABLISH_CONFIRM_PDU, needs to be defined.

S27': After receiving the session setup response message of the RDP proxy, the RDP controller sends the acquired voice session media information of the RDP proxy to the VOIP software.

S28': The VOIP software sends a call response message to the communication peer end, where the call response message carries the voice session media information of the RDP proxy acquired from the RDP controller.

After the foregoing interaction process, the cloud desktop client cooperates with the cloud desktop virtual machine to complete the call setup process with the communication peer end by using the access router or the access switch (RDP proxy).

In this embodiment, when a VOIP call is made between an RDP client at a local end and a communication peer end, an RDP proxy learns virtual channel media information of the RDP client at the local end and voice session information of the communication peer end, and sends voice session media information of the RDP proxy to a cloud desktop virtual machine. The cloud desktop virtual machine sends the voice session media information of the RDP proxy to the communication peer end. After learning the voice session media information of the RDP proxy, the communication peer end sends a voice stream to the RDP proxy. The RDP proxy sends the voice stream from the communication peer end to the RDP client at the local end and sends a voice stream from the RDP client at the local end to the communication peer end, thereby implementing the VOIP call between the RDP client at the local end and the communication peer end. Compared with the prior art, the RDP proxy implements bidirectional transmission of the voice streams without requiring a cloud computing server in a data center. Therefore, a communication delay and load of the cloud computing server in the data center are reduced. In addition, the RDP proxy runs on a main control board of an access router or an access switch, or runs on an open service platform board of the access router or the access switch. In this way, because data transmission performed on a local area network between the cloud desktop client and the access router and/or the access switch requires high bandwidth and a low delay, a voice delay of both parties of the communication is reduced when voice communication is performed between the cloud desktop client and the communication peer end, so that the voice communication is more efficient.

Figure 10:
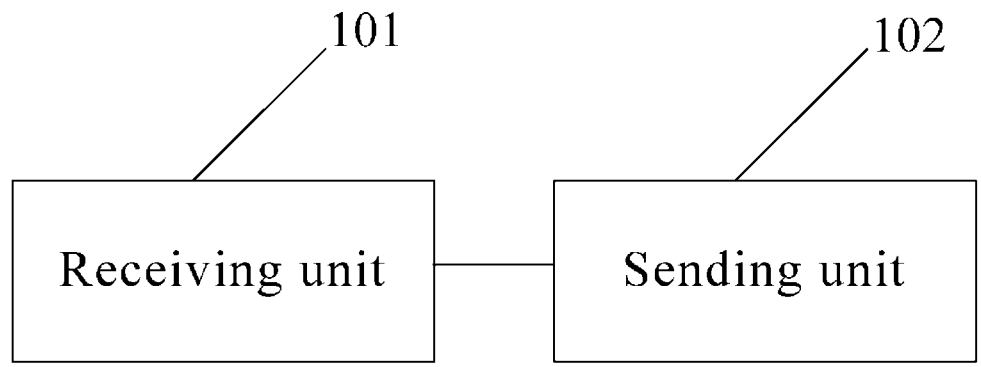
FIG. 10 is a structural block diagram of a cloud desktop virtual machine apparatus according to an embodiment of the present invention.

In addition, corresponding to the method for implementing a VOIP call in a cloud computing environment provided by this embodiment of the present invention, the present invention further provides a cloud desktop virtual machine apparatus, as shown in FIG. 10, including: a receiving unit 101 configured to receive a VOIP call request message from an RDP client at a local end or a communication peer end; and a sending unit 102 configured to send a session setup request message to an RDP proxy according to the VOIP call request message received by the receiving unit 101.

The receiving unit 101 is further configured to receive a session setup response message sent by the RDP proxy, where the session setup response message includes voice session media information of the RDP proxy.

The sending unit 102 is further configured to send the voice session media information of the RDP proxy to the communication peer end, so that the communication peer end performs, according to the voice session media information of the RDP proxy, a VOIP call with the RDP client at the local end by using the RDP proxy.

According to the cloud desktop virtual machine apparatus provided by this embodiment of the present invention, when a VOIP call is made between an RDP client at a local end and a communication peer end, the sending unit 102 sends voice session media information of an RDP proxy to the communication peer end, so that after learning the voice session media information of the RDP proxy, the communication peer end sends a voice stream to the RDP proxy. The RDP proxy sends the voice stream from the communication peer end to the RDP client at the local end and sends a voice stream from the RDP client at the local end to the communication peer end, thereby implementing the VOIP call between the RDP client at the local end and the communication peer end. Compared with the prior art, the RDP proxy implements bidirectional transmission of the voice streams without requiring the cloud desktop virtual machine. Therefore, a communication delay and load of the cloud desktop virtual machine are reduced.

The receiving unit 101 is further configured to receive a remote desktop connection request message sent by the RDP proxy, where the remote desktop connection request message includes proxy information of the RDP proxy.

The sending unit 102 is configured to send a session setup request message to the remote desktop protocol proxy according to the call request message and the proxy information of the remote desktop protocol proxy.

Further, in an embodiment of the present invention, when the VOIP call request message received by the receiving unit 101 is from the RDP client at the local end, the sending unit 102 is configured to send the VOIP call request message to the communication peer end, where the VOIP call request message includes the voice session media information of the RDP proxy.

The receiving unit 101 is further configured to, after the sending unit 102 sends the VOIP call request message to the communication peer end, receive a call response message sent by the communication peer end, where the call response message includes voice session media information of the communication peer end.

The sending unit 102 is further configured to send a session modification request message to the RDP proxy, where the session modification request message includes the voice session media information of the communication peer end, so that the RDP proxy implements the VOIP call between the RDP client at the local end and the communication peer end according to the voice session media information of the communication peer end.

Optionally, in another embodiment of the present invention, when the VOIP call request message received by the receiving unit 101 is from the communication peer end, the call request message includes voice session media information of the communication peer end.

The sending unit 102 is configured to send a session setup request message to the RDP proxy according to the call request message received by the receiving unit 101, where the session setup request message includes the voice session media information of the communication peer end, so that the RDP proxy implements the VOIP call between the RDP client at the local end and the communication peer end according to the voice session media information of the communication peer end.

The sending unit 102 is configured to send a call response message to the communication peer end, where the call response message includes the voice session media information of the RDP proxy.

Figure 11A:
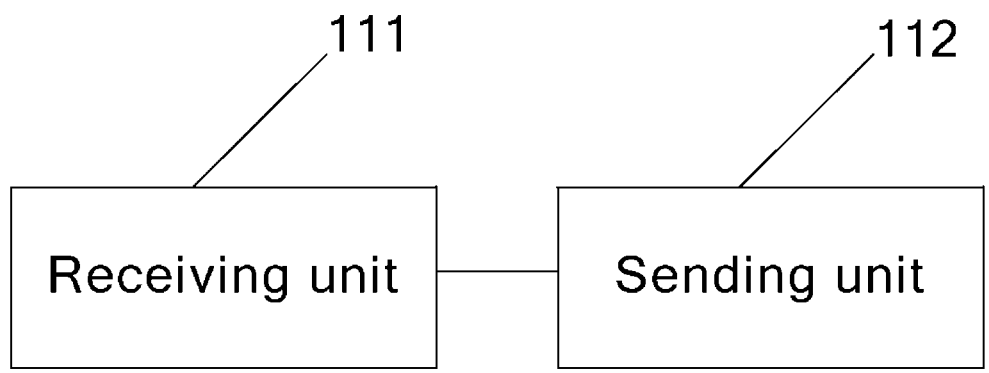
FIG. 11A is a structural block diagram of an RDP proxy apparatus according to an embodiment of the present invention.

Accordingly, the present invention further provides an RDP proxy apparatus, as shown in FIG. 11A, including: a receiving unit 111 configured to receive a session setup request message sent by a cloud desktop virtual machine according to a VOIP call request message of an RDP client at a local end or a communication peer end; and a sending unit 112 configured to send a voice channel setup request message to the RDP client at the local end according to the session setup request message received by the receiving unit 111.

The receiving unit 111 is further configured to receive a voice channel setup response message sent by the RDP client at the local end, where the voice channel setup response message includes virtual channel media information of the RDP client at the local end.

The sending unit 112 is further configured to send a session setup response message to the cloud desktop virtual machine, where the session setup response message includes voice session media information of the RDP proxy apparatus, so that the cloud desktop virtual machine sends the voice session media information of the RDP proxy apparatus to the communication peer end.

The receiving unit 111 is further configured to receive a voice stream from the RDP client at the local end and a voice stream from the communication peer end.

The sending unit 112 is further configured to forward the voice stream from the RDP client at the local end and the voice stream from the communication peer end, so as to implement a VOIP call between the RDP client at the local end and the communication peer end.

According to the RDP proxy apparatus provided by this embodiment of the present invention, a receiving unit 111 receives voice session media information sent by an RDP client at a local end. When a VOIP call is made between the RDP client at the local end and a communication peer end, a sending unit 112 sends voice session media information of an RDP proxy apparatus to the communication peer end, so that after learning the voice session media information of the RDP proxy apparatus, the communication peer end sends a voice stream to the RDP proxy apparatus. The RDP proxy apparatus sends the voice stream from the communication peer end to the RDP client at the local end and sends a voice stream from the RDP client at the local end to the communication peer end, thereby implementing the VOIP call between the RDP client at the local end and the communication peer end. Compared with the prior art, the RDP proxy apparatus implements bidirectional transmission of the voice streams without requiring the cloud desktop virtual machine. Therefore, a communication delay and load of the cloud desktop virtual machine server are reduced.

The receiving unit 111 is further configured to, before receiving the session setup request message sent by the cloud desktop virtual machine, receive a remote desktop connection request sent by the RDP client at the local end.

Figure 11B:
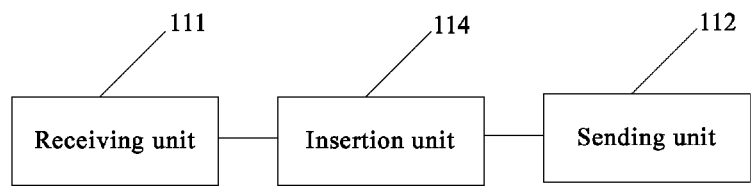
FIG. 11B is a structural block diagram of an RDP proxy apparatus according to an embodiment of the present invention.

As shown in FIG. 11B, the RDP proxy apparatus further includes an insertion unit 114 configured to insert proxy information of the RDP proxy apparatus into the remote desktop connection request received by the receiving unit.

The sending unit 112 is further configured to send, to the cloud desktop virtual machine, a remote desktop connection request message into which the proxy information is inserted by the insertion unit, so as to set up a remote desktop connection between the RDP client at the local end and the cloud desktop virtual machine.

Figure 11C:
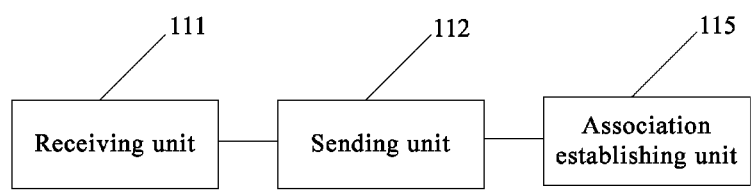
FIG. 11C is a structural block diagram of an RDP proxy apparatus according to an embodiment of the present invention.

As shown in FIG. 11C, the receiving unit 111 is further configured to, before receiving the session setup request message sent by the cloud desktop virtual machine, receive a first remote desktop connection request sent by the RDP client at the local end; the sending unit 112 is further configured to send a first remote desktop connection response message to the RDP client at the local end, so as to set up a first remote desktop connection with the RDP client at the local end; and the sending unit 112 is further configured to send a second remote desktop connection request message to the cloud desktop virtual machine, so as to set up a second remote desktop connection with the cloud desktop virtual machine.

The RDP proxy apparatus further includes an association establishing unit 115 configured to establish an associative relationship between the first remote desktop connection and the second remote desktop connection, so as to set up a remote desktop connection between the RDP client at the local end and the cloud desktop virtual machine.

Figure 11D:
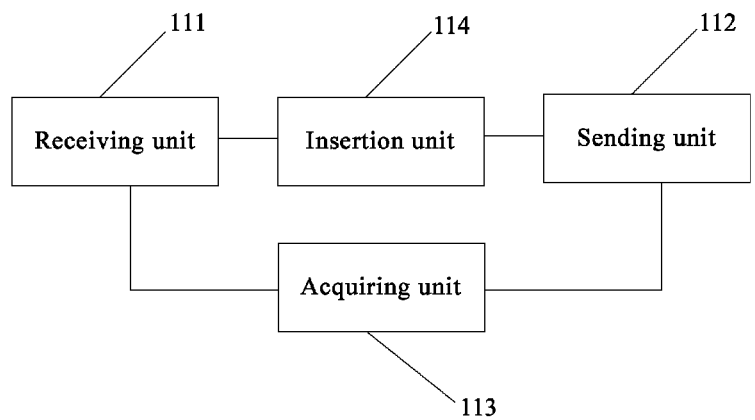
FIG. 11D is a structural block diagram of an RDP proxy apparatus according to an embodiment of the present invention.
Figure 11E:
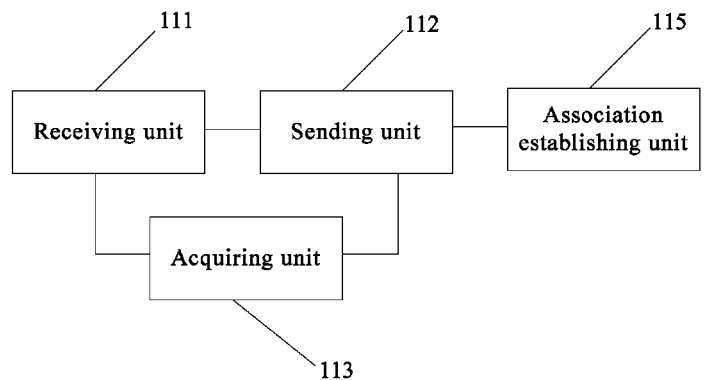
FIG. 11E is a structural block diagram of an RDP proxy apparatus according to an embodiment of the present invention.

Optionally, in an embodiment of the present invention, as shown in FIG. 11D or FIG. 11E, the RDP proxy apparatus further includes an acquiring unit 113 configured to acquire voice session media information of the communication peer end when the receiving unit 111 receives a session setup request message sent by the cloud desktop virtual machine according to the VOIP call request message of the RDP client at the local end.

The receiving unit 111 is further configured to receive a session modification request message sent by the cloud desktop virtual machine, where the session modification request message carries the voice session media information of the communication peer end.

The acquiring unit 113 is configured to acquire the voice session media information of the communication peer end according to the session modification request message received by the receiving unit 111.

Optionally, in another embodiment of the present invention, also as shown in FIG. 11D or FIG. 11E, the RDP proxy apparatus further includes an acquiring unit configured to acquire voice session media information of the communication peer end; when the receiving unit receives a session setup request message sent by the cloud desktop virtual machine according to the VOIP call request message of the communication peer end, the call setup request message includes the voice session media information of the communication peer end.

The acquiring unit 113 is configured to acquire the voice session media information of the communication peer end according to the session setup request message received by the receiving unit.

Further, preferably, the RDP proxy apparatus is set in an access router or an access switch.

Figure 12:
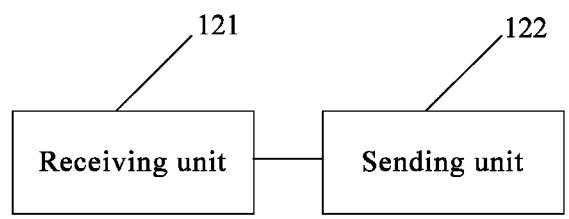
FIG. 12 is a structural block diagram of a communications apparatus according to an embodiment of the present invention.

Accordingly, the present invention further provides a communications apparatus, as shown in FIG. 12, including: a receiving unit 121 configured to receive a voice channel setup request message sent by an RDP proxy, where the voice channel setup request message is sent by the RDP proxy according to a session setup request message sent by a cloud desktop virtual machine; and a sending unit 122 configured to send a voice channel setup response message to the RDP proxy according to the voice channel setup request message received by the receiving unit 121, where the voice channel setup response message includes virtual channel media information of the communications apparatus.

The receiving unit 121 is further configured to receive a voice stream from a communication peer end sent by the RDP proxy.

The sending unit 122 is further configured to send a voice stream to the RDP proxy, so that the RDP proxy sends the voice stream to the communication peer end.

According to the communications apparatus provided by this embodiment of the present invention, when a VOIP call is made with a communication peer end, a receiving unit 121 receives a voice stream from the communication peer end sent by an RDP proxy; a sending unit 122 sends a voice stream to the RDP proxy, so that the RDP proxy sends the voice stream to the communication peer end. The RDP proxy sends the voice stream from the communication peer end to the communications apparatus and sends the voice stream from the communications apparatus to the communication peer end, thereby implementing the VOIP call between the communications apparatus and the communication peer end. Compared with the prior art, the RDP proxy implements bidirectional transmission of the voice streams without requiring the cloud desktop virtual machine. Therefore, a communication delay and load of the cloud desktop virtual machine server are reduced.

Further, the sending unit 122 is further configured to send a remote desktop connection request to the cloud desktop virtual machine by using the RDP proxy.

Optionally, in an embodiment of the present invention, the communications apparatus is a calling end and the communication peer end is a called end.

The sending unit 122 is further configured to send a call request message of the communication peer end to the cloud desktop virtual machine, so that the cloud desktop virtual machine sends a session setup request message to the RDP proxy.

Figure 13:
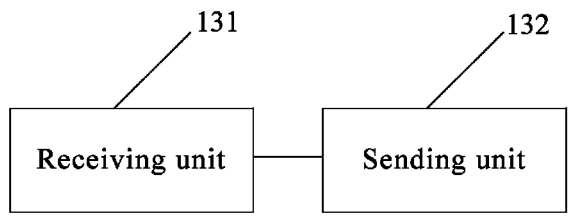
FIG. 13 is a structural block diagram of a communications apparatus according to an embodiment of the present invention.

Accordingly, the present invention further provides a communications apparatus, as shown in FIG. 13, including: a receiving unit 131 configured to receive voice session media information of an RDP proxy sent by a cloud desktop virtual machine; and a sending unit 132 configured to send a voice stream to the RDP proxy according to the voice session media information of the RDP proxy received by the receiving unit 131, so that the RDP proxy sends the voice stream to an RDP client at a local end.

The receiving unit 131 is further configured to receive a voice stream from the RDP client at the local end sent by the RDP proxy.

According to the communications apparatus provided by this embodiment of the present invention, when a VOIP call is made with an RDP client at a local end, a receiving unit 131 receives voice session media information of an RDP proxy sent by a cloud desktop virtual machine; a sending unit 132 sends a voice stream to the RDP proxy according to the voice session media information of the RDP proxy received by the receiving unit 131, so that the RDP proxy sends the voice stream to the RDP client at the local end; and the receiving unit 131 receives a voice stream from the RDP client at the local end sent by the RDP proxy. The RDP proxy sends the voice stream from the communication peer end to the RDP client at the local end and sends the voice stream from the RDP client at the local end to the communications apparatus, thereby implementing the VOIP call between the RDP client at the local end and the communications apparatus. Compared with the prior art, the RDP proxy implements bidirectional transmission of the voice streams without requiring the cloud desktop virtual machine. Therefore, a communication delay and load of the cloud desktop virtual machine are reduced.

Optionally, in an embodiment of the present invention, the communications apparatus is a called end and the RDP client at the local end is a calling end.

The receiving unit 131 is configured to receive a call request message sent by the cloud desktop virtual machine, where the call request message includes the voice session media information of the RDP proxy.

The sending unit 132 is further configured to send a call response message to the cloud desktop virtual machine, where the call response message includes voice session media information of the communications apparatus, so that the cloud desktop virtual machine sends the voice session media information of the communications apparatus to the RDP proxy.

Optionally, in another embodiment of the present invention, the communications apparatus is the calling end and the RDP client at the local end is the called end.

The sending unit 132 is further configured to send a call request message to the cloud desktop virtual machine, where the call request message includes voice session media information of the communications apparatus.

The receiving unit 131 is configured to receive a call response message sent by the cloud desktop virtual machine, where the call response message includes the voice session media information of the RDP proxy.

In addition, accordingly, an embodiment of the present invention further provides a network system, including the cloud desktop virtual machine in the foregoing embodiment and the RDP proxy apparatus in the foregoing embodiment.

It is worth noting that the units included in the foregoing embodiments of the cloud desktop virtual machine apparatus, the RDP proxy apparatus, and the communications apparatus are divided only according to function logic. However, the division is not limited thereto so long as corresponding functions can be implemented. In addition, the specific name of each functional unit is only for the convenience of differentiation and is not intended to limit the protection scope of the present invention.

The method for implementing a VOIP call in a cloud computing environment, a cloud desktop virtual machine apparatus, an RDP proxy apparatus, and a network system provided by the embodiments of the present invention enable information interaction among a cloud desktop virtual machine, an RDP proxy, an RDP client at a local end, and a communication peer end during a process of implementing a VOIP call between the RDP client at the local end and the communication peer end, and eventually enable the RDP proxy to receive and forward a VOIP voice stream from the RDP client at the local end and a VOIP voice stream from the communication peer end, thereby implementing the VOIP call between the RDP client at the local end and the communication peer end. Compared with the prior art, the RDP proxy implements bidirectional transmission of the voice streams, which require no processing by the cloud desktop virtual machine of a cloud computing server, and do not through a WAN network twice. Therefore, a communication delay and load of the cloud computing server are reduced.

A person of ordinary skill in the art may understand that all or a part of the steps of the methods in the embodiments may be implemented by a program instructing relevant hardware. The program may be stored in a computer readable storage medium. The storage medium may be a read-only memory, a magnetic disk, an optical disc, or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing a voice over Internet Protocol (VOIP) call in a cloud computing environment, comprising:

receiving, by a cloud desktop virtual machine, a first VOIP call request message from a Remote Desktop Protocol (RDP) client included in a cloud desktop client, wherein the cloud desktop virtual machine is located in a cloud computing server in a data center, wherein the cloud desktop client corresponds to the cloud desktop virtual machine, and wherein an RDP proxy is used to connect the cloud desktop client to a Wide Area Network (WAN) between the cloud desktop client and the data center, wherein the cloud desktop client gains access to the cloud desktop virtual machine in the cloud computing server, and wherein the RDP proxy is set in an access device located at an edge of an enterprise network in which the cloud desktop client is located;

sending, by the cloud desktop virtual machine, a first session setup request message to the RDP proxy according to the first VOIP call request message to trigger the RDP proxy acquiring first virtual channel information of the RDP client from the RDP client;

receiving, by the cloud desktop virtual machine, a first session setup response message sent by the RDP proxy, wherein the first session setup response message comprises first voice session media information of the RDP proxy;

sending, by the cloud desktop virtual machine, the first VOIP call request message to a communication peer end, wherein the first VOIP call request message comprises the first voice session media information of the RDP proxy;

receiving, by the cloud desktop virtual machine, a first VOIP call response message from the communication peer end, wherein the first VOIP call response message comprises first voice session media information of the communication peer end; and sending, by the cloud desktop virtual machine, a session modification request message to the RDP proxy, wherein the session modification request message comprises the first voice session media information of the communication peer end, to complete a first call setup process between the RDP client and the communication peer end.

2. The method according to claim 1, wherein before receiving the first VOIP call request message from the RDP client, the method further comprises:

receiving, by the cloud desktop virtual machine, a remote desktop connection request message sent by the RDP proxy, wherein the remote desktop connection request message comprises proxy information of the RDP proxy, and wherein sending the first session setup request message to the RDP proxy according to the first VOIP call request message comprises sending, by the cloud desktop virtual machine, the first session setup request message to the RDP proxy according to the first VOIP call request message and the proxy information of the RDP proxy.

3. The method according to claim 1, wherein the method further comprises:
receiving, by the cloud desktop virtual machine, a second VOIP call request message from the communication peer end, wherein the second VOIP call request message comprises second voice session media information of the communication peer end;
sending, by the cloud desktop virtual machine, a second session setup request message to the RDP proxy according to the second VOIP call request message to trigger the RDP proxy to acquire second virtual channel information of the RDP client from the RDP client and to reserve second voice session media information of the RDP proxy;
receiving, by the cloud desktop virtual machine, a second session setup response message sent by the RDP proxy, wherein the second session setup response message comprises the second voice session media information of the RDP proxy; and
sending, by the cloud desktop virtual machine, a second VOIP call response message to the communication peer end, wherein the second VOIP call response message comprises the second voice session media information of the RDP proxy to complete a second call setup process between the RDP client and the communication peer end.

4. A method for implementing a voice over Internet Protocol (VOIP) call in a cloud computing environment, comprising:
receiving, by a Remote Desktop Protocol (RDP) proxy, a session setup request message sent by a cloud desktop virtual machine according to a VOIP call request message of an RDP client included in a cloud desktop client, wherein the cloud desktop virtual machine is located in a cloud computing server in a data center, wherein the cloud desktop client corresponds to the cloud desktop virtual machine, wherein an RDP proxy is used to connect the cloud desktop client to a Wide Area Network (WAN) between the cloud desktop client and the data center, wherein the cloud desktop client gains access to the cloud desktop virtual machine in the cloud computing server, and wherein the RDP proxy is set in an access device located at an edge of an enterprise network in which the cloud desktop client is located;
sending, by the RDP proxy, a voice channel setup request message to the RDP client according to the session setup request message;
receiving, by the RDP proxy, a voice channel setup response message sent by the RDP client, wherein the voice channel setup response message comprises virtual channel media information of the RDP client;
sending, by the RDP proxy, a session setup response message to the cloud desktop virtual machine, wherein the session setup response message comprises voice session media information of the RDP proxy, wherein the cloud desktop virtual machine sends the voice session media information of the RDP proxy to the communication peer end;
receiving, by the RDP proxy, a session modification request message sent by the cloud desktop virtual machine, wherein the session modification request message comprises voice session media information of the communication peer end;
acquiring, by the RDP proxy, the voice session media information of the communication peer end according to the session modification request message to complete a VOIP call setup process between the RDP client and the communication peer end; and
receiving and forwarding, by the RDP proxy, a VOIP voice stream from the RDP client and a VOIP voice stream from the communication peer end to implement a VOIP call between the RDP client and the communication peer end.

5. The method according to claim 4, wherein before receiving the session setup request message sent by the cloud desktop virtual machine, the method further comprises:
receiving, by the RDP proxy, a remote desktop connection request sent by the RDP client;
inserting, by the RDP proxy, proxy information of the RDP proxy into the remote desktop connection request; and
sending, by the RDP proxy to the cloud desktop virtual machine, a remote desktop connection request message into which the proxy information is inserted, so as to set up a remote desktop connection between the RDP client and the cloud desktop virtual machine.

6. The method according to claim 4, wherein before receiving the session setup request message sent by the cloud desktop virtual machine, the method further comprises:
receiving, by the RDP proxy, a first remote desktop connection request sent by the RDP client so as to set up a first remote desktop connection with the RDP client;
sending, by the RDP proxy, a second remote desktop connection request message to the cloud desktop virtual machine so as to set up a second remote desktop connection with the cloud desktop virtual machine; and
establishing, by the RDP proxy, an associative relationship between the first remote desktop connection and the second remote desktop connection so as to set up a remote desktop connection between the RDP client and the cloud desktop virtual machine.

7. A non-transitory computer readable medium having computer executable instructions stored thereon, wherein the computer executable instructions comprise instructions for:
receiving a first voice over Internet Protocol (VOIP) call request message from a Remote Desktop Protocol (RDP) client included in a cloud desktop client, wherein the cloud desktop client corresponds to a cloud desktop virtual machine apparatus, wherein an RDP proxy is used to connect the cloud desktop client to a Wide Area Network (WAN) between the cloud desktop client and the data center, wherein the cloud desktop client gains access to the cloud desktop virtual machine apparatus in the cloud computing server, and wherein the RDP proxy is set in an access device located at an edge of an enterprise network in which the cloud desktop client is located;
sending a first session setup request message to the RDP proxy according to the first VOIP call request message to trigger the RDP proxy acquiring first virtual channel information of the RDP client from the RDP client;
receiving a first session setup response message sent by the RDP proxy, wherein the first session setup response message comprises the first voice session media information of the RDP proxy;
sending the first VOIP call request message to a communication peer end, wherein the first VOIP call request message comprises the first voice session media information of the RDP proxy;

receiving a first VOIP call response message from the communication peer end, wherein the first VOIP call response message comprises first voice session media information of the communication peer end; and sending a session modification request message to the RDP proxy, wherein the session modification request message comprises the first voice session media information of the communication peer end, to complete a first call setup process between the RDP client and the communication peer end.

8. The non-transitory computer readable medium according to claim 7, wherein the computer executable instructions further comprise instructions for:

receiving a second VOIP call request message, wherein the second VOIP call request message comprises second voice session media information of the communication peer end;

sending a second session setup request message to the RDP proxy according to the second VOIP call request message, so that the RDP proxy acquires second virtual channel information of the RDP client from the RDP client and reserves second voice session media information of the RDP proxy;

receiving a second session setup response message sent by the RDP proxy, wherein the second session setup response message comprises the second voice session media information of the RDP proxy; and sending a second VOIP call response message to the communication peer end, wherein the second VOIP call response message comprises second voice session media information of the RDP proxy, to complete a second call setup process between the RDP client and the communication peer end.

9. A non-transitory computer readable medium having computer executable instructions stored thereon, wherein the computer executable instructions comprise instructions for:

receiving a session setup request message sent by a cloud desktop virtual machine according to a Voice over Internet Protocol (VOIP) call request message of a Remote Desktop Protocol (RDP) client included in a cloud desktop client, wherein the cloud desktop client is located in the enterprise network, wherein the cloud desktop virtual machine is located in a cloud computing server in a data center, wherein the cloud desktop client corresponds to the cloud desktop virtual machine, wherein the RDP proxy apparatus is used to connect the cloud desktop client to a Wide Area Network (WAN) between the cloud desktop client and the data center, so that the cloud desktop client gains access to the cloud desktop virtual machine in the cloud computing server;

sending a voice channel setup request message to the RDP client according to the session setup request message;

receiving a voice channel setup response message sent by the RDP client, wherein the voice channel setup response message comprises virtual channel media information of the RDP client;

sending a session setup response message to the cloud desktop virtual machine, wherein the session setup response message comprises voice session media information of the RDP proxy apparatus so that the cloud desktop virtual machine sends the voice session media information of the RDP proxy apparatus to the communication peer end;

receiving a session modification request message sent by the cloud desktop virtual machine, wherein the session modification request message comprises voice session media information of the communication peer end;

acquiring the voice session media information of a communication peer end according to the session modification request message, to complete a VOIP call setup process between the RDP client and the communication peer end; and receiving and forward a VOIP voice stream from the RDP client and a VOIP voice stream from the communication peer end, so as to implement a VOIP call between the RDP client and the communication peer end.

10. The non-transitory computer readable medium according to claim 9, wherein the computer executable instructions further comprise instructions for:

receiving a remote desktop connection request sent by the RDP client;

inserting proxy information of the RDP proxy apparatus into the remote desktop connection request; and sending to the cloud desktop virtual machine, a remote desktop connection request message into which the proxy information is inserted by the insertion unit so as to set up a remote desktop connection between the RDP client and the cloud desktop virtual machine.

11. The non-transitory computer readable medium according to claim 9, wherein the computer executable instructions further comprise instructions for:

receiving a first remote desktop connection request message sent by the RDP client so as to set up a first remote desktop connection with the RDP client;

sending a second remote desktop connection request message to the cloud desktop virtual machine so as to set up a second remote desktop connection with the cloud desktop virtual machine; and establishing an associative relationship between the first remote desktop connection and the second remote desktop connection so as to set up a remote desktop connection between the RDP client and the cloud desktop virtual machine.

* * * * *